Patented Dec. 23, 1924.

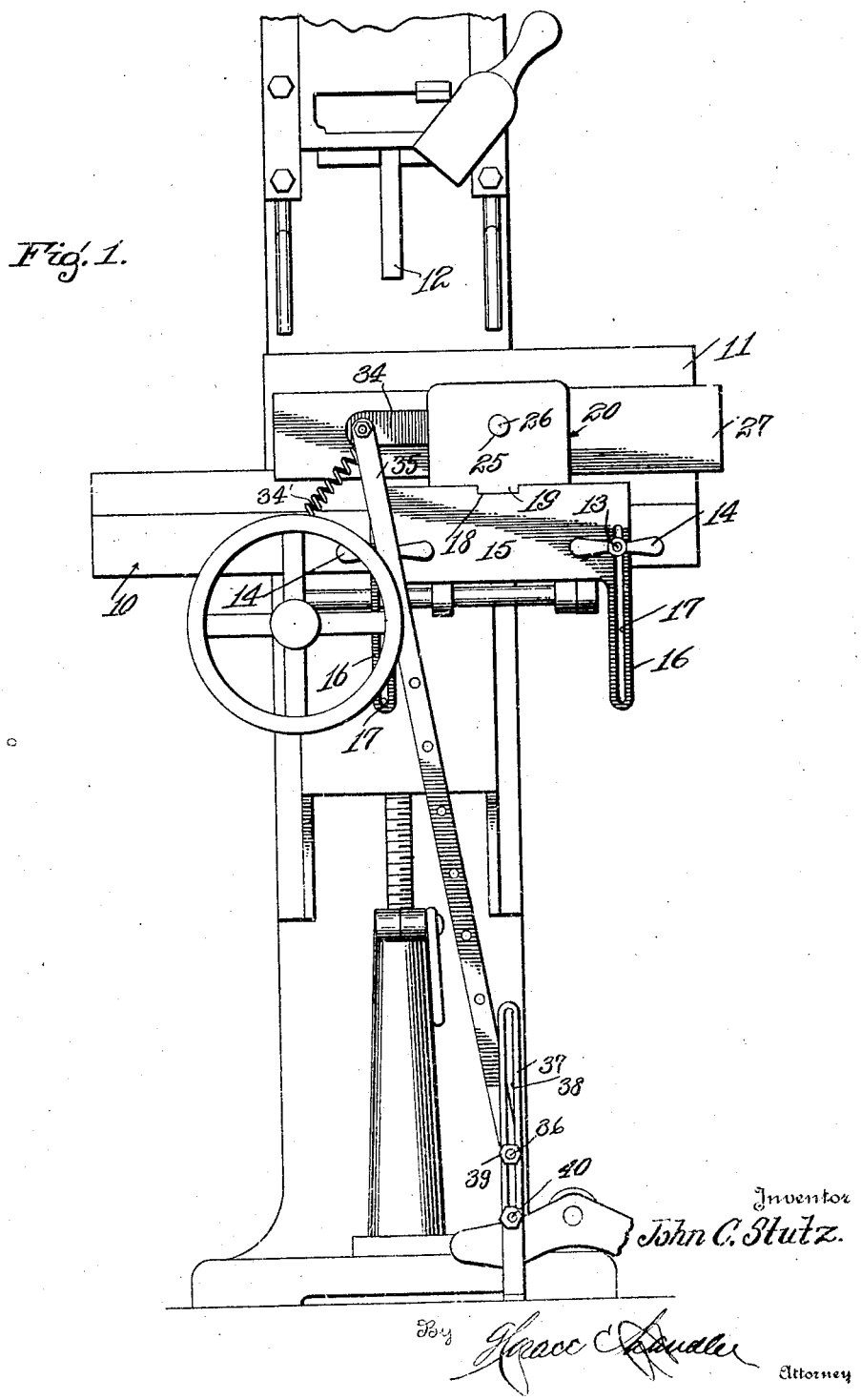

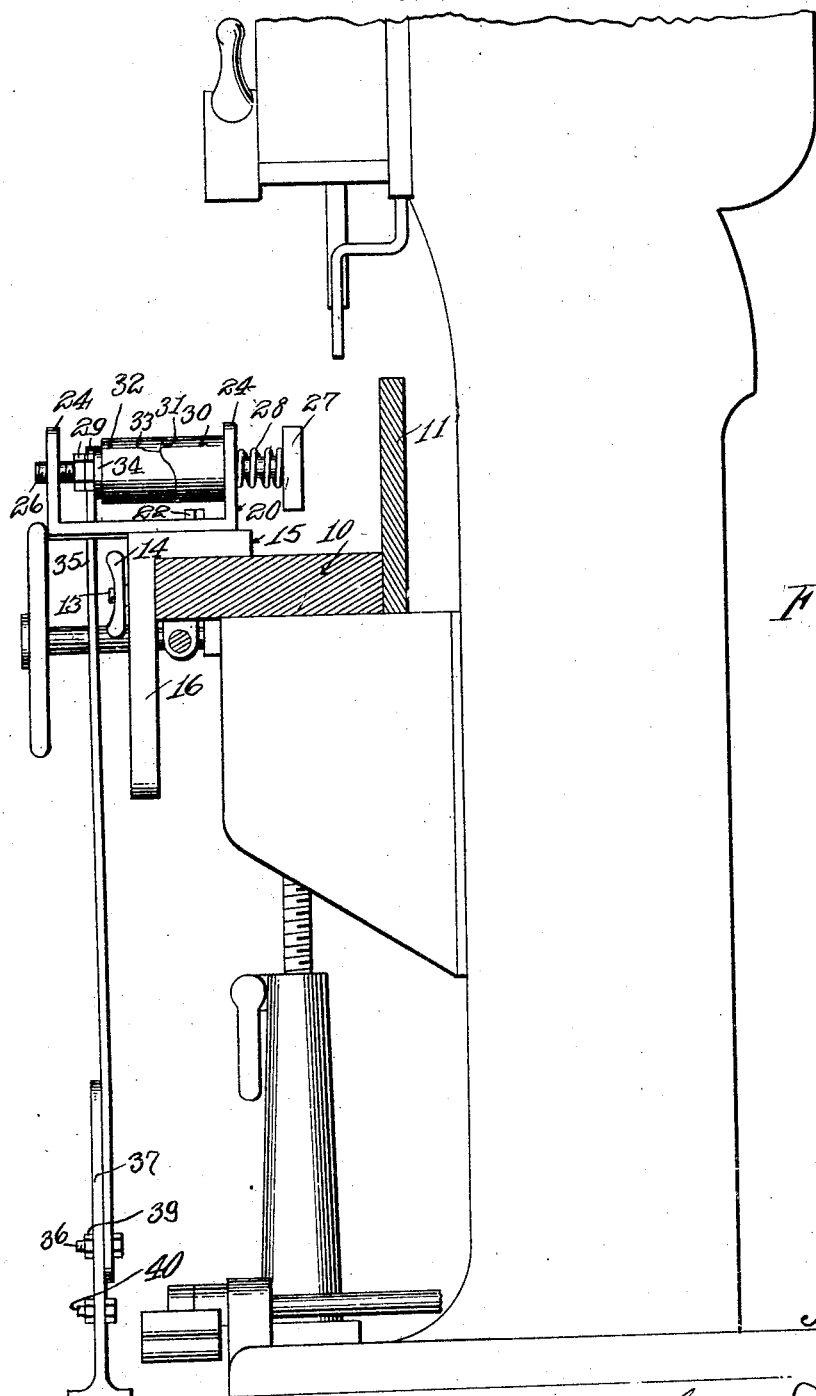

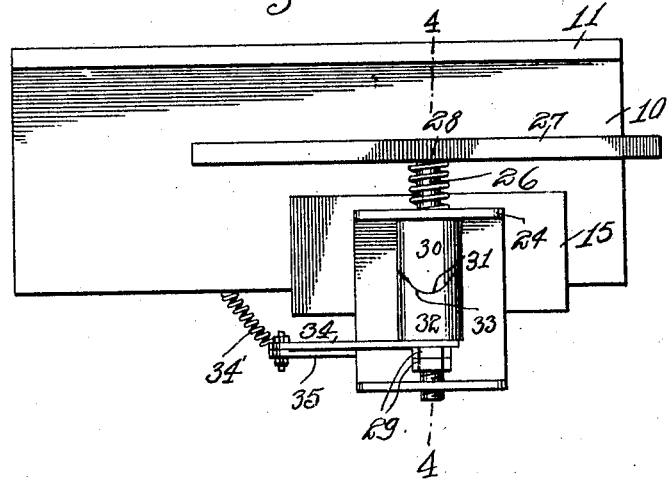
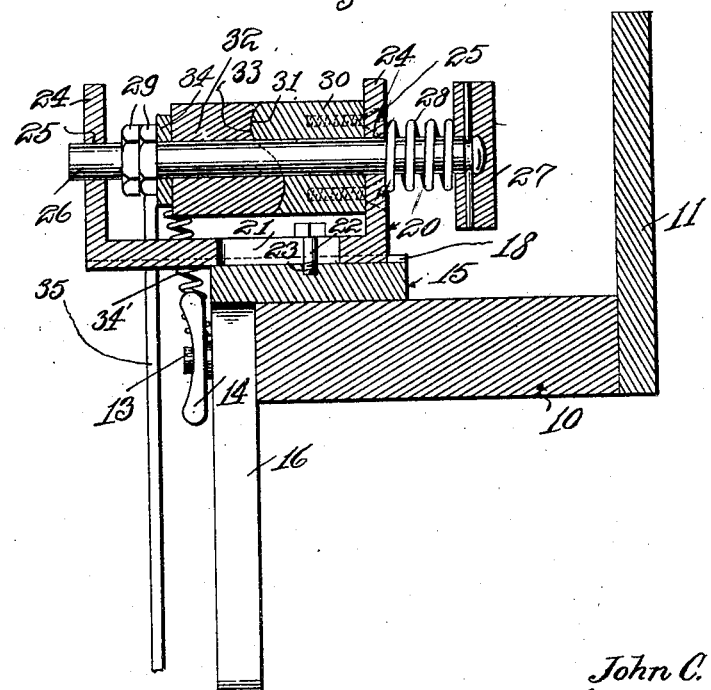

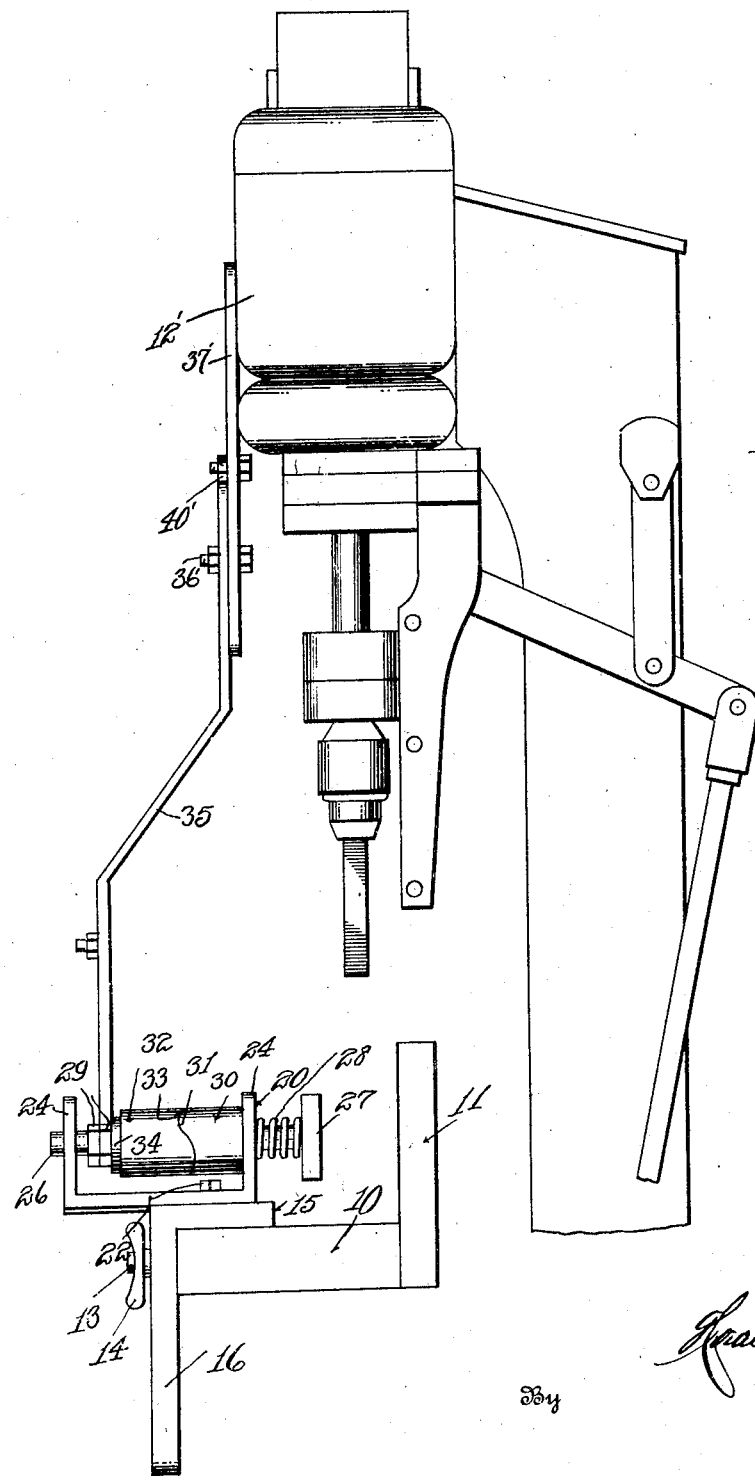

1,520,611

UNITED STATES PATENT OFFICE.

JOHN C. STUTZ, OF ALBUQUERQUE, NEW MEXICO.

AUTOMATIC WORK HOLDER.

Application filed January 29, 1924. Serial No. 689,278.

*To all whom it may concern:*

Be it known that I, JOHN C. STUTZ, a citizen of the United States, residing at Albuquerque, in the county of Bernalillo, State of New Mexico, have invented certain new and useful Improvements in Automatic Work Holders; and I do hereby declare the following to be a full, clear, and exact description of the invention, such as will enable others skilled in the art to which it appertains to make and use the same.

This invention relates to new and useful improvements in woodworking machines, and particularly to machines for mortising.

In machines of this character, now in general use, there is provided a screw operated or cam operated clamp which presses the work against the fence at the rear of the table, and when the mortise has been cut, and the table lowered, it being necessary to manually rotate the screw, or the cam, to engage or release the clamp with respect to the work. This requires considerable time, and labor, and it is the principal object of the present invention to provide an automatically operated mechanism, whereby when the table has been lowered, at the completion of the cutting of the mortise, the clamp will be automatically released from the work, thus enabling the operator to quickly withdraw the work from the table.

Another object is to provide a work clamp which will automatically engage the work, at the instant that the machine starts its operation, or when the operator causes the table to be lifted toward the cutter.

A still further object is to provide a device of this character which is readily adjustable to different characters and dimensions of work, whereby the clamp will operate as effectively with a thick piece of work as with a thin one.

A still further object is to provide a device of this character which may readily be attached to the table of the machines of this class now in use, without modifications to the machine, and one which will properly and more effectively take the place of the ordinary hand-operated clamps.

A still further object is to provide a device of this character which is capable of use in connection with a machine wherein the cutter head is movable and the table remains stationary.

Other objects and advantages will be apparent from the following description when taken in connection with the accompanying drawings.

In the drawings:

Figure 1 is a front elevation of a portion of a mortising machine showing the invention applied thereto.

Figure 2 is an end elevation, showing the invention in side view, and the table in section.

Figure 3 is a top plan view of the same.

Figure 4 is an enlarged vertical sectional view on the line 4—4 of Figure 3, passing longitudinally of the cam shaft.

Figure 5 is a view similar to that of Figure 2, showing the invention applied to a machine wherein the table remains stationary and the cutter moves.

Referring particularly to the accompanying drawings, 10 represents the table of a mortising machine, having the rear vertical fence 11, against which the work is clamped, while being acted upon by the cutter 12.

Threaded into the front edge of the table 10 are two screws or bolts 13 having handles 14 on their outer ends, by means of which they may be rotated. Engaged on the outer edge of the table is an inverted L-shaped bracket 15, the depending legs of which are longitudinally slotted, as at 17, and receive therethrough the bolts 13. By means of these bolts, and the slotted legs 16, the bracket is capable of vertical adjustment with relation to the table, and in accordance with the thickness of the work being acted upon. Formed transversely in the upper face of the horizontal portion of the bracket 15 is a groove 18, in which is fitted the rib 19 formed on the bottom of the U-shaped frame 20, said frame having a slot 21, extending longitudinally through the rib, and receiving the screw 22 therethrough, said screw being engaged in a threaded opening 23, in the bottom of the groove 18 of the bracket. This construction permits the frame 20 to be adjusted toward and away from the fence 11, for work of different thicknesses. Each of the vertical arms 24, of the frame 20 is formed with an opening 25, and slidably disposed through these openings is a rod 26, the inner end of which is swively connected with the clamp head 27, which is adapted to press against the work. On the rod, between the outer arm 24, and the head 27, is a coil spring 28, which normally urges the rod into position to engage against the work, so as to press the latter against the fence 11. The end of the rod which passes through the opening in the outer arm 24 is threaded, and engaged on this portion of the rod, inwardly of the arm 24, are the lock nuts 29, which are arranged to engage with the adjacent arm 24, to limit the movement of the rod through the openings 25, as the head 27 moves away from the work.

Secured to the inner face of the inner arm 24, and receiving the rod 26 therethrough, is a collar 30, the exposed end face of which is formed with a cam 31. A similarly formed collar 32 is also disposed on the rod and is arranged to interfit its cam face 33 with the cam 31. Secured to the other end of the collar 32 is an arm 34, which also embraces the rod, and extends radially therefrom. A spring 34' is connected to the outer end of this arm 34, and to the edge of the table 10, for normally urging the arm downwardly to cause the cam faces of the collars 30 and 32 to interfit, and permit the spring 28 to move the head 27 against the work. Pivotally connected to the free end of the arm 34 is a downwardly extending link 35, and carried by the lower end of the link is a bolt 36. Secured to the floor, adjacent the base of the machine, is an upwardly extending member 37, which is formed with a longitudinal slot 38, receiving the said bolt 36 slidably therein, said bolt being retained by the nut 39, thereon. This bolt 36 is arranged to engage with a stop bolt 40, adjustably engaged in the slot 38, as the link 35 moves down.

When the table is moved upwardly, as in the operation of the machine, to advance the work toward the cutter, the spring 34' exerts a downward pull on the arm 34, resulting in the rotation of the collar 32, and the proper interfitting of the cam faces of this collar and the collar 30, being urged into such position by the coil spring 28. This results in the head 27 being pressed against the work. At the completion of the cutting of the mortise, and when the operator causes the table to be lowered, to disengage the work from the cutter, the bolt 36 will engage with the bolt 40 causing the link 35 to be pushed upwardly, and the arm 34 to be rocked. As the arm is rocked the cam collar 32 is rotated, and by reason of the cam face 33 engaging with the cam face 31, the rod 26 will be forced in a direction toward the outer edge of the table 10, against the pressure of the spring 28, so that the head 27 is withdrawn from the work. The work is thus released and the operator may readily remove same from the table, without the necessity of manually rotating screws or cams. A new piece of work can then be placed on the table, and immediately upon the operator causing the table to rise, the bolt 36 will be lifted from the bolt 40, and the spring 34' permited to draw the arm 34 downwardly, permitting the cam faces 31 and 33 to snap into interfitting engagement, under the influence of the spring 28, which thrusts the head 27 against the work. The operator is thus relieved of the inconvenience, and time required in applying and releasing the work clamp by hand.

The supporting bracket is capable of being raised and lowered to suit the character or width of the work, while the stop bolt 40 is adjustable into different positions in the slot 38, to operate at the desired time, in accordance with the position of the table.

The device is adapted for use in connection with machines wherein the tool holder moves, while the table remains stationary. In this case the slotted floor member 37' is mounted on the tool carrier or holder 12', and the positions of the bolts 36' and 40' reversed in the slot 38, so that as the bolt 36' moves downwardly in the slot it will engage with the bolts 40' and actuate the cams 31 and 33, in the same manner as heretofore described, resulting in the release of the work clamp head 27, from the work.

What is claimed is:

1. The combination with the vertically movable table of a mortising machine, of a work clamp mounted on the table and including a spring pressed element and a stationary element, a cam associated with the spring pressed element, a cam associated with the stationary element, and means connected with the cam of the spring pressed element and engageable with an obstruction upon downward movement of the table to rotate said cam and withdraw the spring pressed element from the work.

2. The combination with the movable work table of a mortising machine, of supporting means on the table, a spring pressed work clamp on the supporting means normally urged against a piece of work, a stationary cam associated with the supporting means, a movable cam associated with the supporting means, and means operable against an obstruction upon movement of the table in one direction for moving the movable cam in engagement with the stationary cam to withdraw the clamp from the work.

3. The combination with the movable work table of a mortising machine, of a supporting means mounted on the table, a rod slidable through the supporting means, a spring for normally urging the rod toward work engaging position, a stationary cam carried by the supporting means, a rotatable cam engaged with the first cam and supported on said rod, and means carried by the rotatable cam for engagement with an obstruction to rock the rotatable cam and cause the withdrawal of the rod from work engaging position.

In testimony whereof, I affix my signature, in the presence of two witnesses.

JOHN C. STUTZ.

Witnesses:
C. S. WHITE,
E. B. DOANE.